United States Patent
Jurng et al.

(10) Patent No.: US 9,844,767 B2
(45) Date of Patent: Dec. 19, 2017

(54) CATALYST FILTER COMPRISING NANO METALLIC CATALYST SPRAYED ON THE SURFACE OF SUPPORT

(71) Applicant: KOREA INSTITUTE OF SCIENCE AND TECHNOLOGY, Seoul (KR)

(72) Inventors: Jongsoo Jurng, Seoul (KR); Min Su Kim, Seoul (KR); Eun Seuk Park, Seoul (KR); Hyoun Duk Jung, Seoul (KR); Jin Young Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/227,001

(22) Filed: Aug. 3, 2016

(65) Prior Publication Data
US 2017/0056858 A1     Mar. 2, 2017

(30) Foreign Application Priority Data
Aug. 28, 2015   (KR) ......................... 10-2015-0122097

(51) Int. Cl.
*B01J 23/22*      (2006.01)
*B01J 23/42*      (2006.01)
(Continued)

(52) U.S. Cl.
CPC .......... *B01J 23/28* (2013.01); *B01D 53/8675* (2013.01); *B01J 35/04* (2013.01); *B01J 37/0215* (2013.01);
(Continued)

(58) Field of Classification Search
CPC ... B01J 23/28; B01J 23/22; B01J 23/42; B01J 23/44; B01J 23/06; B01J 23/34; B01J 23/74; B01J 35/04; B01J 35/06; B01J 37/0215; B01D 2255/1021; B01D 2255/1023; B01D 2255/20723;
(Continued)

(56) References Cited

U.S. PATENT DOCUMENTS 5,162,287 A * 11/1992 Yoshimoto ........... B01D 53/944
                                                                    423/215.5
6,583,071 B1    6/2003 Weidman et al.
(Continued)

FOREIGN PATENT DOCUMENTS

JP       05-049935     *  3/1993   ............. B01J 29/24
JP        5-49935 A        3/1993
(Continued)

*Primary Examiner* — Patricia L. Hailey
(74) *Attorney, Agent, or Firm* — NSIP Law

(57) ABSTRACT

Disclosed is a catalyst filter, which includes a catalyst support and a nano metallic catalyst sprayed to a surface of the catalyst support. The catalyst filter uses catalyst slurry prepared by using a particulate catalyst, in which a small amount of nano metallic catalyst exhibiting a catalyst performance is sprayed to a surface of the catalyst support, different from an existing patent technique in which catalyst particles are formed and prepared as a support to consume a large amount of catalyst. Therefore, the specific surface area of the catalyst filter is not smaller than the specific surface area of the nano catalyst particles, and thus the catalyst filter may effectively remove and decompose ultra-low concentration gas-state contaminants in an indoor air.

21 Claims, 3 Drawing Sheets

(51) Int. Cl.
  *B01J 23/44* (2006.01)
  *B01J 23/06* (2006.01)
  *B01J 23/34* (2006.01)
  *B01J 35/06* (2006.01)
  *B01J 23/28* (2006.01)
  *B01J 35/04* (2006.01)
  *B01J 37/02* (2006.01)
  *B01D 53/86* (2006.01)

(52) U.S. Cl.
  CPC ... *B01J 37/0232* (2013.01); *B01D 2255/2073* (2013.01); *B01D 2255/20707* (2013.01); *B01D 2255/20723* (2013.01); *B01D 2257/106* (2013.01); *B01D 2258/06* (2013.01)

(58) Field of Classification Search
  CPC .. B01D 2255/2073; B01D 2255/20738; B01D 2255/20746; B01D 2255/20753; B01D 2255/20769; B01D 2255/20792; B01D 2255/2255
  USPC ............... 502/307, 312, 315, 316, 324, 326, 502/337–339; 977/773, 775, 810
  See application file for complete search history.

(56) References Cited

U.S. PATENT DOCUMENTS

| | | | |
|---|---|---|---|
| 7,205,049 B2* | 4/2007 | Andrews | ................ C01B 15/04 423/69 |
| 7,759,281 B2 | 7/2010 | Kezuka et al. | |
| 8,685,363 B2 | 4/2014 | Fukuda et al. | |
| 2001/0027165 A1* | 10/2001 | Galligan | ............... B01D 53/885 502/439 |
| 2009/0312179 A1* | 12/2009 | Chettouf | ................. B01J 21/06 502/242 |
| 2011/0052467 A1* | 3/2011 | Chase | ................ B01D 53/8678 423/239.1 |
| 2012/0111802 A1* | 5/2012 | Sheintuch | ................ B01J 21/18 210/757 |
| 2012/0129691 A1 | 5/2012 | Chin et al. | |
| 2014/0018237 A1 | 1/2014 | Jurng et al. | |

FOREIGN PATENT DOCUMENTS

| | | | | |
|---|---|---|---|---|
| JP | 11-076718 | * | 3/1999 | ............ B01D 39/14 |
| JP | 11-76718 A | | 3/1999 | |
| JP | 2005-169334 | * | 6/2005 | ............ B01J 37/02 |
| JP | 2005-169334 A | | 6/2005 | |
| JP | 2005-199204 A | | 7/2005 | |
| JP | 2008-514410 A | | 5/2008 | |
| JP | 2013-184137 A | | 9/2013 | |
| KR | 10-2001-0037883 A | | 5/2001 | |
| KR | 10-2001-0037883 | * | 5/2002 | ............ B01J 23/44 |
| KR | 10-0336963 B1 | | 5/2002 | |
| KR | 10-2004-0099976 A | | 12/2004 | |
| KR | 10-2006-0112445 A | | 11/2006 | |
| KR | 10-2012-0054254 A | | 5/2012 | |
| KR | 10-1154903 B1 | | 6/2012 | |
| KR | 10-1250915 B1 | | 4/2013 | |
| KR | 10-2014-0010558 A | | 1/2014 | |
| WO | WO 2006/037387 A1 | | 4/2006 | |

* cited by examiner

CATALYST FILTER COMPRISING NANO METALLIC CATALYST SPRAYED ON THE SURFACE OF SUPPORT

CROSS-REFERENCE TO RELATED APPLICATION

This application claims priority to Korean Patent Application No. 10-2015-0122097, filed on Aug. 28, 2015, and all the benefits accruing therefrom under 35 U.S.C. §119, the contents of which in its entirety are herein incorporated by reference.

BACKGROUND

1. Field

The present disclosure relates to a catalyst filter comprising a nano metallic catalyst.

2. Description of the Related Art

When preparing a filter, am existing ceramic filter material selected to operate under a high-temperature condition does not have good economic feasibility as an air cleaner due to its high price. To solve this problem, an existing filter has been obtained by coating a filter material such as paper and cotton with a catalyst particle. However, when producing a paper filter, if the amount of catalyst particle is excessive, the catalyst particle may give an influence on property and color of the filter, thereby deteriorating marketability. In addition, the catalyst particle has insufficient stability and thus may not give a sufficient effect. Moreover, since the coated material may precipitate, condense and oxidize due to chemical bonding, the performance of the filter is deteriorated.

RELATED ART (Patent Literature 1) KR336963 B1
(Patent Literature 2) KR1154903 B1

SUMMARY

In an existing catalyst support preparing method in which synthesized nano particles are supported in a filter media, the particles may be condensed (agglomerated) and cover a binder, and thus the specific surface area of the catalyst support is greatly deteriorated in comparison to the specific surface area of the nano catalyst particles which are original material. In addition, since it is difficult to enhance surface dispersion of the nano particles and a large amount of nano catalyst particles is consumed, it is not easy to commercialize and mass-produce catalyst coating filters.

In order to solve the above problem, the present disclosure is directed to providing a catalyst filter comprising a nano metallic catalyst.

In order to accomplish the above object, in an aspect, the present disclosure provides a catalyst filter, comprising a catalyst support and a nano metallic catalyst sprayed to a surface of the catalyst support. In addition, in an aspect, the present disclosure provides a catalyst filter exhibiting very excellent volatile organic compound decomposition activity as an air cleaner by variously changing a preparation method, for example a slurry state, a binder kind, temperature, manufacture time or the like.

The catalyst filter according to an embodiment of the present disclosure uses catalyst slurry prepared using a particulate catalyst, in which a small amount of nano metallic catalyst exhibiting a catalyst performance is sprayed to a surface of the catalyst support, different from an existing patent technique in which catalyst particles are formed and prepared as a support to consume a large amount of catalyst. The catalyst filter according to an embodiment of the present disclosure corresponds to an air-cleaning catalyst filter which exhibit activity in low temperature, show excellent economic feasibility, and has a different preparation method from existing patents in terms of a slurry state, a binder kind, temperature, manufacture time or the like.

Therefore, in the catalyst filter according to an embodiment of the present disclosure, the specific surface area of the catalyst filter is not smaller than the specific surface area of the nano catalyst particles, and thus the catalyst filter may effectively remove and decompose ultra-low concentration gas-state contaminants in an indoor air. In addition, the catalyst filter according to an embodiment of the present disclosure is expected to have good market competitiveness when being applied to fields related to an air clear.

BRIEF DESCRIPTION OF THE DRAWINGS

FIG. 2A shows that the coating slurry is sprayed to a corrugated type carbon paper filter which is a kind of catalyst support, and FIG. 2B shows that the catalyst support to which the coating slurry is sprayed is dried.

DETAILED DESCRIPTION

Figure 1:
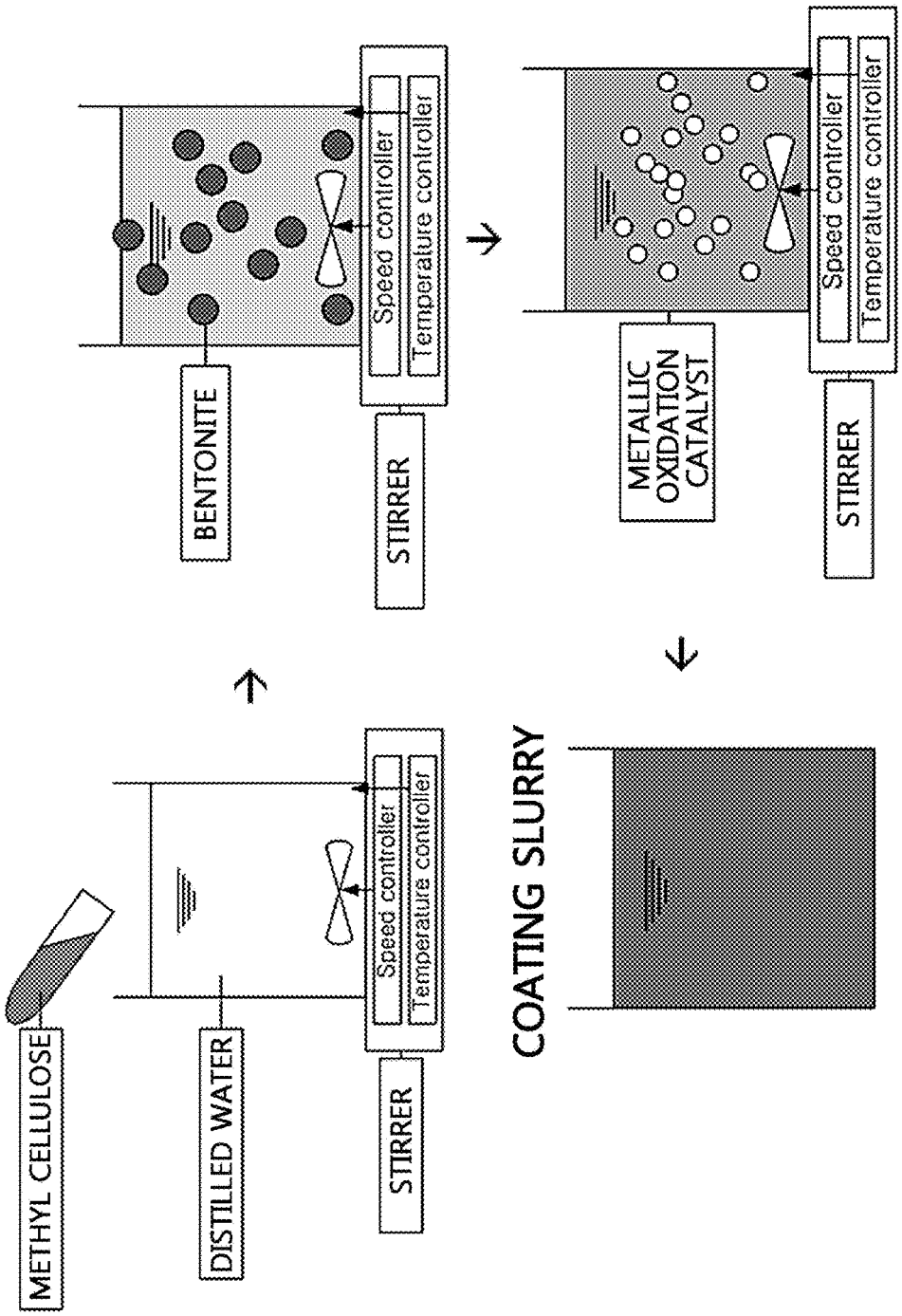
FIG. 1 is a diagram for illustrating a method for preparing a coating slurry including a nano metallic catalyst sprayed on a surface of the catalyst support. Here, the coating slurry including a nano metallic catalyst is prepared along an arrow direction.
Figure 2A:
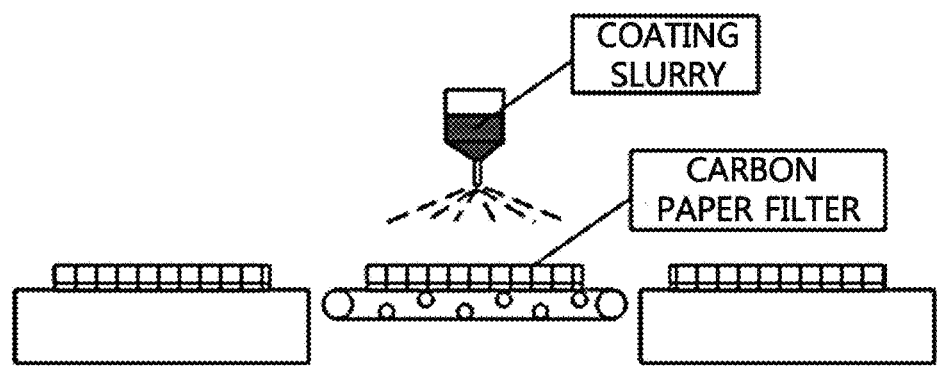
FIG. 2A and FIG. 2B are diagrams for illustrating a method for preparing a catalyst filter by performing a spray coating method and a low-temperature drying method to the prepared coating slurry. Here.
Figure 2B:
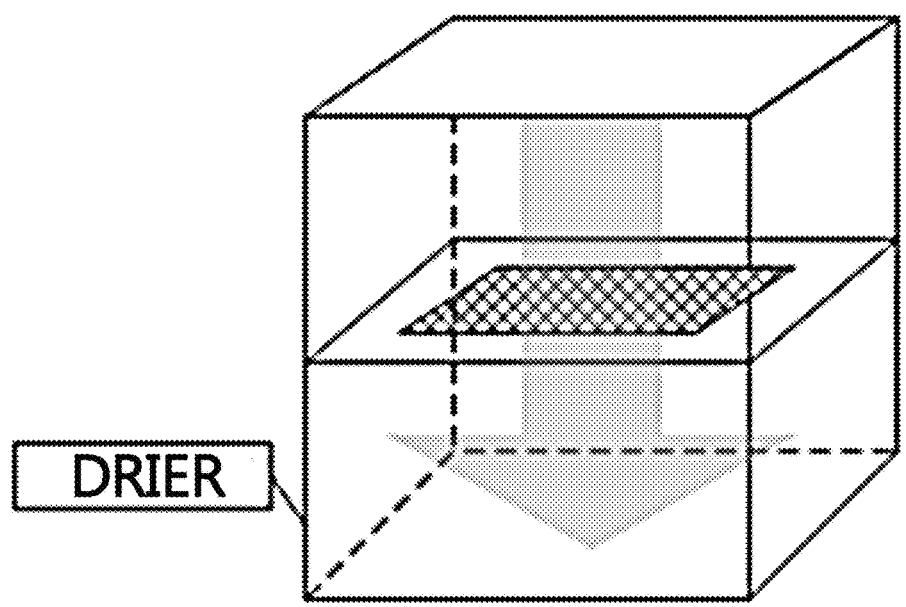

An embodiment of the present disclosure is directed to a catalyst filter, including a catalyst support and a nano metallic catalyst sprayed on a surface of the catalyst support.

In an embodiment of the present disclosure, the nano metallic catalyst may be spray-coated to a surface of the catalyst support.

In an embodiment of the present disclosure, the nano metallic catalyst may be sprayed to the surface of the catalyst support to form a film layer.

In an embodiment of the present disclosure, the catalyst support may be paper, cotton or ceramic.

In an embodiment of the present disclosure, the catalyst support may be at least one selected from the group consisting of carbon paper, corrugated type carbon paper, carbon cloth, carbon felt, fibrous textile, cellulose pulp paper, non-woven fabric, honeycomb paper filter and cordierite.

In an embodiment of the present disclosure, the nano metallic catalyst may be a precious metal catalyst made of platinum or palladium; or a transition metal catalyst prepared by impregnating at least one of titanium dioxide ($TiO_2$), silicon dioxide ($SiO_2$) and aluminum oxide ($Al_2O_3$) with at least one of copper, manganese, iron, vanadium, molybdenum, cobalt, nickel and zinc.

In an embodiment of the present disclosure, the nano metallic catalyst may be a manganese oxide-titania catalyst or a vanadia-titania catalyst.

In an embodiment of the present disclosure, the nano metallic catalyst may be prepared by means of chemical vapor condensation. The chemical vapor condensation is disclosed in Korean patent application Nos. 10-2012-0076675, 10-2012-0074786, and 10-2012-0054254, the contents of which in its entirety are herein incorporated by reference.

In an embodiment of the present disclosure, the manganese oxide-titania catalyst may be a catalyst in which manganese oxide is supported by titania particles, and has a specific surface area of 200 $m^2/g$ to 300 $m^2/g$.

In an embodiment of the present disclosure, the nano metallic catalyst may be provided by 15 weight % to 30 weight %, on the basis of the weight of the catalyst filter. In detail, the nano metallic catalyst may be provided by 5 weight % or above, 10 weight % or above, 15 weight % or above, 17 weight % or above, 19 weight % or above, 20 weight % or above, 21 weight % or above, 25 weight % or above, 30 weight % or above, 35 weight % or above, 40 weight % or above, or 50 weight % or below, 45 weight % or below, 40 weight % or below, 35 weight % or below, 30 weight % or below, 25 weight % or below, 23 weight % or below, 21 weight % or below, 20 weight % or below, 19 weight % or below, 17 weight % or below, 15 weight % or below, 10 weight % or below, or 5 weight % or below, on the basis of the weight of the catalyst filter, without being limited thereto.

In an embodiment of the present disclosure, a weight of the nano metallic catalyst per unit area of the catalyst filter may be 300 $g/m^2$ to 450 $g/m^2$. In detail, a weight of the nano metallic catalyst per unit area of the catalyst filter may be 200 $g/m^2$ or above, 250 $g/m^2$ or above, 300 $g/m^2$ or above, 350 $g/m^2$ or above, 370 $g/m^2$ or above, 380 $g/m^2$ or above, 390 $g/m^2$ or above, 400 $g/m^2$ or above, 420 $g/m^2$ or above, 450 $g/m^2$ or above, 500 $g/m^2$ or above, 600 $g/m^2$ or above, or 600 $g/m^2$ or below, 500 $g/m^2$ or below, 450 $g/m^2$ or below, 420 $g/m^2$ or below, 400 $g/m^2$ or below, 390 $g/m^2$ or below, 380 $g/m^2$ or below, 370 $g/m^2$ or below, 350 $g/m^2$ or below, 300 $g/m^2$ or below, 250 $g/m^2$ or below, or 200 $g/m^2$ or below. The weight of the nano metallic catalyst per unit area of the catalyst filter may be replaced with a coating ratio of the catalyst filter per unit area or a ratio of the nano metallic catalyst per unit area of the catalyst filter.

An embodiment of the present disclosure is also directed to a method for preparing a catalyst filter as above, which includes a spraying step for spraying a nano metallic catalyst onto a surface of a catalyst support.

In an embodiment of the present disclosure, the spraying may be performed by means of spray coating.

In an embodiment of the present disclosure, after the spraying step, the method may further include a distributing step for regularly spreading the nano metallic catalyst on the surface of the catalyst support.

In an embodiment of the present disclosure, in the distributing step, the nano metallic catalyst may be regularly spread on the surface of the catalyst support by using a compressed air.

In an embodiment of the present disclosure, after the spraying step, the method may further include a drying step for drying the catalyst support. In detail, in an embodiment of the present disclosure, the drying step may be performed after the spraying step and the distributing step.

In an embodiment of the present disclosure, the drying step may be performed at a temperature of 40° C. to 70° C. for 2 to 10 hours. In detail, the temperature of the drying step may be 30° C. or above, 35° C. or above, 40° C. or above, 50° C. or above, 60° C. or above, 70° C. or above, 80° C. or above, or 80° C. or below, 70° C. or below, 65° C. or below, 60° C. or below, 55° C. or below, 50° C. or below, 45° C. or below, 40° C. or below, 35° C. or below, or 30° C. or below. In addition, in detail, the performance time of the drying step may be 2 hours or above, 3 hours or above, 4 hours or above, 5 hours or above, 6 hours or above, 7 hours or above, 8 hours or above, 9 hours or above, 10 hours or above, or 10 hours or below, 9 hours or below, 8 hours or below, 7 hours or below, 6 hours or below, 5 hours or below, 4 hours or below, 3 hours or below, or 2 hours or below.

In an embodiment of the present disclosure, in the method, after a nano metallic catalyst is sprayed and distributed to one surface of the catalyst support and dried thereon, a nano metallic catalyst may be sprayed and distributed to the other surface of the catalyst support and dried thereon. In detail, in an embodiment of the present disclosure, the nano metallic catalyst may be dried for 3 to 5 hours at one surface and dried for 7 to 9 hours at the other surface.

In an embodiment of the present disclosure, after the drying step, the method may further include a step of removing impurities.

In an embodiment of the present disclosure, the impurity removing step may be performed by blowing a compressed air to the catalyst support.

In an embodiment of the present disclosure, before the spraying step, the method may further include a step of preparing a coating slurry including a nano metallic catalyst, and in the spraying step, the coating slurry may be sprayed to the catalyst support.

In an embodiment of the present disclosure, in the coating slurry preparing step, a) methyl cellulose may be added to a distilled water and stirred at 30° C. to 50° C. for 1 hour to 3 hours; b) bentonite may be added to the slurry of the step a) and stirred at 30° C. to 50° C. for 1 hour to 3 hours; and c) a nano metallic catalyst may be added to the slurry of the step b) and stirred at 30° C. to 50° C. for 1 hour to 3 hours. In an embodiment of the present disclosure, the coating slurry may be a mixture of 15 wt % to 20 wt % of nano metallic catalyst, 8 wt % to 12 wt % of bentonite, 1 wt % to 2 wt % of methyl cellulose and 65 wt % to 75 wt % of water, based on the entire weight of the coating slurry.

The present disclosure will be described later in more detail based on examples, comparative examples and experimental examples as follows. Materials, samples, costs, manipulations or the like described in the following examples may be appropriately modified without departing from the scope of the present disclosure. Therefore, the scope of the present disclosure is not limited to the detailed examples as follows.

[Example 1] Preparation of a Corrugated Type Carbon Paper Filter to Which a Nano Metallic Catalyst is Sprayed (1) Preparation of a Nano Metallic Catalyst Titania particles and manganese oxide employed in this example were prepared according to the disclosure of [Example 1] of Korean patent application No. 10-2012-0076675 or [Example] of Korean patent application No. 10-2012-0054254.

In detail, 5.0 weight % of manganese acetate (Mn(CH$_3$COO)$_2$) was added to a titanium tetra-iso-propoxide (TTIP, Ti[OCH(CH$_3$)$_2$]$_4$) solution on the basis of the entire weight of a precursor. Also, the precursor mixture was put into a bubbler dipped in an oil path, and the temperature of the bubbler was maintained at 95° C. for evaporation. Then, the evaporated precursor mixture was carried to an alumina tube of an electric furnace by using an argon (Ar) gas. Along with it, a compressed air was supplied to the alumina tube.

At this time, the argon (Ar) gas was injected into the alumina tube at a flow rate of 0.7 L/min, and the compressed air was injected into the alumina tube at a flow rate of 7.0 L/min. Also, the temperature in the alumina tube was maintained at 900° C. so that a manganese oxide-titania catalyst of a core-shell structure coated with the manganese oxide (MnO$_2$) is composed on the surface of titania (TiO$_2$). After that, the prepared catalyst was cooled at 50° C. in a double-piped collector at which a coolant flows, to collect and retrieve catalyst particles at intervals of 2 hours.

(2) Preparation of Coating Slurry

In order to disperse the nano metallic catalyst to a catalyst support, coating slurry including such a catalyst was prepared according to the order depicted in FIG. 1. The coating slurry was prepared by setting a weight ratio, on the basis of the weight of the nano metallic catalyst. The coating slurry may be prepared with a mixture ratio of 15 wt % to 20 wt % of metallic catalyst, 8 wt % to 12 wt % of bentonite, 1 wt % to 2 wt % of methyl cellulose and 65 wt % to 75 wt % of water.

In detail, 2 g of methyl cellulose was added to 100 L of pure distilled water and stirred at 40° C. for 2 hours to fully dissolve methyl cellulose in the distilled water. After the prepared slurry was fully dissolved, 15 g of bentonite was added little by little not to cause condensation and stirred at the same temperature (40° C.) for 2 hours to adjust viscosity. 25 g of the manganese oxide-titania catalyst prepared in Process (1) above was added to the prepared slurry and stirred at the same temperature (40° C.) for about 2 hours to be fully dissolved, thereby preparing a coating slurry.

Figure 3:
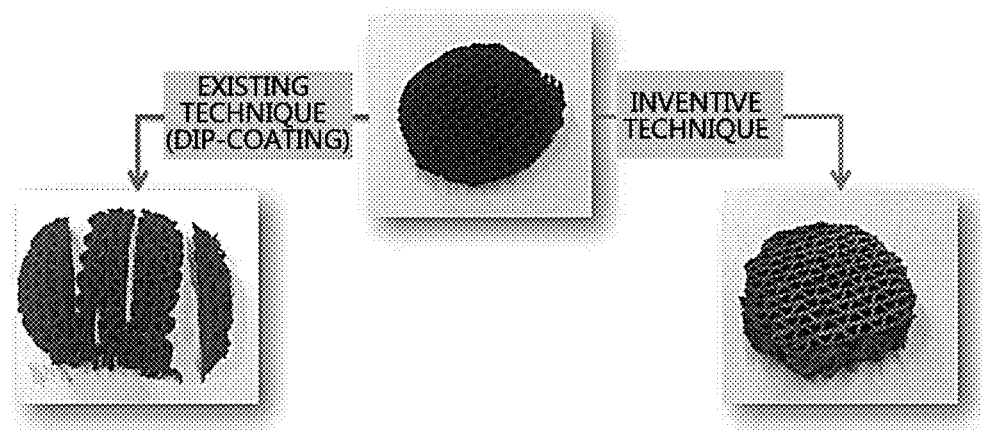
FIG. 3 is a diagram showing a test result of durability of the prepared catalyst filter, using photographs depicting the appearances of a filter prepared by an existing dip-coating method and a catalyst filter according to an embodiment of the present disclosure.

(3) Spraying the Coating Slurry to a Corrugated Type Carbon Paper Catalyst Support The coating slurry prepared in Process (2) above was sprayed to a surface of a corrugated type carbon paper (NG Tech, Co., Ltd.) as shown in FIG. 3. The coating slurry sprayed to the surface of the corrugated type carbon paper was regularly spread without any agglomeration by means of a compressed air. After that, the corrugated type carbon paper was put into a drier at 60° C. and dried for 4 hours. The coating slurry was similarly sprayed to the back surface of the dried corrugated type carbon paper and regularly spread without any agglomeration by means of a compressed air, and then the corrugated type carbon paper was put into a drier at 60° C. and dried for 8 hours. A compressed air was blown to the corrugated type carbon paper having both surfaces coated with a film layer having a nano metallic catalyst, to remove impurities, thereby obtaining a corrugated type carbon paper filter catalyst to which the nano metallic catalyst is sprayed as shown in FIG. 3.

[Comparative Example 1] Preparation of a Corrugated Type Carbon Paper Filter by Means of Dip Coating A corrugated type carbon paper catalyst filter was prepared according to an existing dip-coating method by using the coating slurry prepared in Process (2) above.

In detail, a corrugated type carbon paper as shown in FIG. 3 was prepared and soaked in a coating slurry for 10 minutes. After 10 minutes, the corrugated type carbon paper was taken out from the catalyst slurry, and a compressed air or the like was blown to the catalyst slurry existing in cells of the corrugated type carbon paper so that catalyst particles are not entirely blown out but the cells of the corrugated type carbon paper are ensured, thereby uniformly coating the catalyst slurry to the corrugated type carbon paper. If the above work was completed and the catalyst slurry was regularly distributed at the corrugated type carbon paper, the corrugated type carbon paper was dried in a drier at 60° C. for 2 hours. After that, the above process was repeated three times to the dried corrugated type carbon paper. After that, the corrugated type carbon paper coated with the catalyst slurry was dried overnight (10 hours or above) while maintaining an internal air temperature of 60° C. by using a drier. After that, the corrugated type carbon paper coated with a catalyst was taken out from the drier and burned at 60° C. (with a temperature rise of 10° C./min) for 3 hours in an air-flowing environment by using a burner.

[Comparative Example 2] Preparation of a Cordierite Filter by Means of Dip Coating A cordierite filter was prepared according to an existing dip-coating method by using the coating slurry prepared in Process (2) above.

The cordierite support of a honeycomb type was preprocessed by washing its surface with a nitric acid solution distilled with a distilled water, before a catalyst is attached using the catalyst slurry. The distilled nitric acid solution used above employed nitric acid (69.0 to 70.0%), and 200 mL of nitric acid was put thereto on the basis of 1 L of distilled water. The temperature of the nitric acid solution was maintained at 100° C. The honeycomb-type cordierite support was dipped entirely in the nitric acid solution and left alone for 2 hours. After that, the surface of the honeycomb-type cordierite taken out from the solution was washed using distilled water and dried at 100° C. for 7 hours by using a drier.

The honeycomb-type cordierite support (referred to as a honeycomb support) preprocessed by a nitric acid solution was soaked in the coating slurry prepared in Example 1 for 10 minutes. After 10 minutes, the honeycomb support was taken out from the catalyst slurry, and a compressed air or the like was blown to the catalyst slurry existing in cells of the support so that catalyst particles are not entirely blown out but the cells of the support are ensured, thereby uniformly coating the catalyst slurry to the honeycomb support. If the above work was completed and the catalyst slurry was regularly distributed at the honeycomb support, the honeycomb support was dried in a drier at 100° C. for 2 hours. After that, the above process was repeated three times to the dried honeycomb support. After that, the honeycomb support coated with the catalyst slurry was dried overnight (10 hours or above) while maintaining an internal air temperature of 100° C. by using a drier. After that, the honeycomb support coated with a catalyst was taken out from the drier and burned at 300° C. (with a temperature rise of 10° C./min) for 3 hours in an air-flowing environment by using a burner.

[Experimental Example 1] Evaluation of Durability of the Corrugated Type Carbon Paper Filters Prepared in Different Ways Durability of the corrugated type carbon paper filter of Example 1 in which the nano metallic catalyst is dispersed according to an embodiment of the present disclosure and durability of the corrugated type carbon paper filter prepared by means of dip coating according to Comparative example 1 were evaluated. In detail, after the corrugated type carbon paper filters prepared according to the example and the comparative example were coated, their durability was evaluated on the basis of deformation of their appearances. The evaluation results are shown in FIG. 3.

In FIG. 3, in case of the corrugated type carbon paper prepared by means of spray coating according to an embodiment of the present disclosure, it was found that durability of an adhesive material between the corrugated type carbon papers was not deteriorated, and after the filter was prepared, the corrugated type carbon papers were not separated from each other but maintained their original shape. However, in case of the corrugated type carbon paper prepared by means of an existing dip-coating method, it was found that the adhesion durability of the adhesive material was deteriorated and thus the apparent structure of the filter was destroyed by itself.

Therefore, the catalyst filter according to an embodiment of the present disclosure has an excellent effect since it may decompose volatile organic compounds while maintaining durability of the filter appearance.

[Experimental Example 2] Measurement of an Ozone Decomposition Ratio of Filters Prepared in Different Ways An ozone decomposition ratio of the catalyst filters prepared according to Example 1 and Comparative examples 1 and 2 was measured. In detail, ozone flowed into a reactor (having a cylindrical shape with a diameter of 4 cm), and the catalyst filter was located at a rear end of the reactor to measure concentrations at the front and rear ends of the reactor, thereby measuring a decomposition ratio. The ozone concentration was set to be 10 ppm, the catalyst filter had a circular shape with an outer diameter of 4 cm and a thickness of 1 cm, and the experiment was performed with a flow rate of 1.25 LPM and a space velocity of 6,000 1/h. In case of the corrugated type carbon paper filter prepared by means of dip coating according to Comparative example 1, the appearance was deformed as understood from Experimental example 1, and thus it was impossible to measure the ozone decomposition ratio thereof. The measurement results are shown in Table 1 below.

TABLE 1

| Nano catalyst | Filter material | Coating method | Space velocity (1/h) | Ozone decomposition ratio |
|---|---|---|---|---|
| Mn/CVC | cordierite (Comparative example 2) | Dip coating | 6,000 | 63% |
| Mn/CVC | corrugated type carbon paper (Example 1) | Spray coating | 6,000 | 59% |
| Mn/CVC | corrugated type carbon paper (Comparative example 1) | Dip coating | Not measurable | Not measurable |

Seeing the result of Table 1, it may be found that the corrugated type carbon paper (Example 1) according to an embodiment of the present disclosure exhibits an ozone decomposition ratio in a similar level to the cordierite filter prepared by means of an existing dip-coating method (Comparative example 2). In case of the filter where the corrugated type carbon paper of Comparative example 1 is prepared by means of dip coating, the ozone decomposition ratio could not be measured due to the deformation of the filter appearance. Therefore, the filter according to an embodiment of the present disclosure exhibits an ozone decomposition ratio in the same level as a filter in which the nano metallic catalyst is supported by means of dip coating, thereby giving an excellent effect of decomposing volatile organic compounds. Also, the catalyst filter according to an embodiment of the present disclosure may be easily produced, which ensures good economic feasibility in comparison to existing techniques.

[Experimental Example 3] Observation Results of the Corrugated Type Carbon Paper by a Microscope A surface of the corrugated type carbon paper catalyst filter prepared in Example 1 was observed using an optical microscope (Olympus, BX51-P) and a scanning electronic microscope (Hitachi, S-4100). The observation results are shown in FIG. 4.

Figure 4:
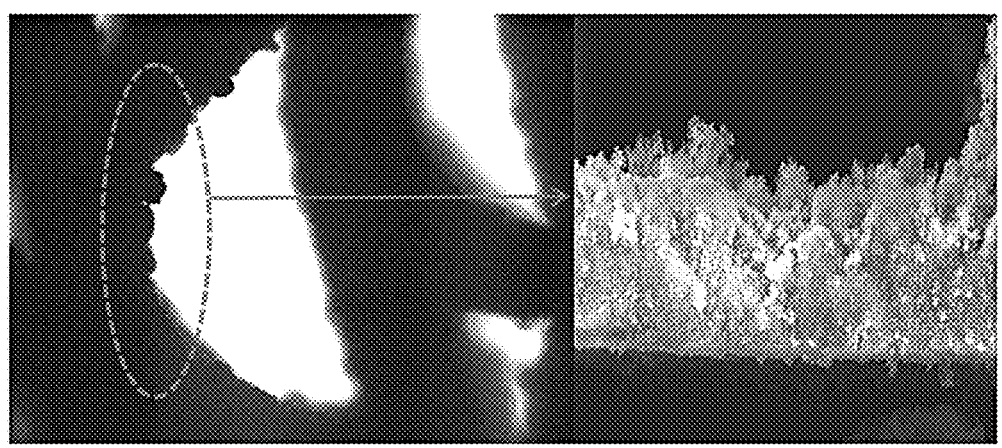
FIG. 4 is a photograph showing a surface of the prepared corrugated type carbon paper filter, observed by an optical and scanning electronic microscope.

In FIG. 4, a left photograph shows a surface of the catalyst filter observed through an optical microscope, and a right photograph corresponds to a dotted region of the left photograph, which is observed through a scanning electronic microscope. In these photographs, the nano metallic catalyst is regularly sprayed to the surface of the corrugated paper, and thus it may be understood that the catalyst filter according to an embodiment of the present disclosure includes the nano metallic catalyst with high dispersibility. Therefore, the catalyst filter according to an embodiment of the present disclosure may be easily prepared at low temperature and thus have an excellent ozone decomposition ratio while maintaining a high specific surface area.

[Experimental Example 4] Experiment Results of Physical Characteristics of the Corrugated Type Carbon Paper In order to check physical characteristics of the catalyst filter prepared according to Example 1, the following experiment was performed.

Diameter and weight of the prepared catalyst of Example 1 were measured. The catalyst filter had a diameter of 4 cm and an area of 12.56 $cm^2$. Before coating, the filter material had a weight of 1.87 g, and after coating, the filter had a weight of 2.35 g, and thus the coated catalyst had a weight of 0.48 g. According to this, it may be found that the weight of catalyst corresponds to about 20 wt % on the basis of the weight of the filter.

In addition, a coating ratio per unit area was calculated to be 382.16 $g/m^2$.

What is claimed is:

1. A catalyst filter, comprising:
   a catalyst support; and
   a nano metallic catalyst dispersed onto a surface of the catalyst support,
   wherein a weight of the nano metallic catalyst per unit area of the catalyst filter is 300 $g/m^2$ to 450 $g/m^2$.

2. The catalyst filter according to claim 1,
   wherein the nano metallic catalyst is spray-coated onto the surface of the catalyst support.

3. The catalyst filter according to claim 1,
   wherein the nano metallic catalyst is sprayed onto the surface of the catalyst support to form a film layer.

4. The catalyst filter according to claim 1,
wherein the catalyst support is any one of paper, cotton, and ceramic.

5. The catalyst filter according to claim 4,
wherein the catalyst support is any one or any combination of any two or more selected from the group consisting of carbon paper, corrugated type carbon paper, carbon cloth, carbon felt, fibrous textile, cellulose pulp paper, non-woven fabric, honeycomb paper filter and cordierite.

6. The catalyst filter according to claim 1,
wherein the nano metallic catalyst comprises a precious metal catalyst made of platinum or palladium, or a transition metal catalyst prepared by impregnating any one or any combination of any two or more of titanium dioxide ($TiO_2$), silicon dioxide ($SiO_2$) and aluminum oxide ($Al_2O_3$) with any one or any combination of any two or more of copper, manganese, iron, vanadium, molybdenum, cobalt, nickel and zinc.

7. The catalyst filter according to claim 6,
wherein the nano metallic catalyst comprises a manganese oxide-titania catalyst or a vanadia-titania catalyst.

8. The catalyst filter according to claim 7,
wherein the manganese oxide-titania catalyst comprises a catalyst in which manganese oxide is supported by titania particles, and comprises a specific surface area of 200 $m^2$/g to 300 $m^2$/g.

9. The catalyst filter according to claim 1,
wherein the nano metallic catalyst is provided by 15 weight % to 30 weight %, on the basis of the weight of the catalyst filter.

10. A method of preparing a catalyst filter, comprising:
spraying a nano metallic catalyst onto a surface of a catalyst support; and
distributing the nano metallic catalyst by regularly spreading the nano metallic catalyst onto the surface of the catalyst support, after the spraying,
wherein the nano metallic catalyst is dispersed onto the surface of the catalyst support.

11. The method of preparing the catalyst filter according to claim 10,
further comprising spraying the nano metallic catalyst using spray coating.

12. The method of preparing the catalyst filter according to claim 10,
wherein the spraying of the nano metallic catalyst comprises spraying the nano metallic catalyst using compressed air.

13. The method of preparing the catalyst filter according to claim 10, further comprising:
drying the catalyst support, after the spraying.

14. The method of preparing the catalyst filter according to claim 13,
wherein the drying of the catalyst support is performed at a temperature of 40° C. to 70° C. for 2 to 10 hours.

15. The method of preparing the catalyst filter according to claim 13, further comprising:
removing impurities after the drying of the catalyst support.

16. The method of preparing the catalyst filter according to claim 15,
wherein the removing of the impurities is performed by blowing compressed air to the catalyst support.

17. The method of preparing the catalyst filter according to claim 10, further comprising:
spraying and distributing the nano metallic catalyst onto another surface of the catalyst support and drying the nano metallic catalyst, after the nano metallic catalyst is sprayed and distributed onto the surface of the catalyst support and dried.

18. The method of preparing the catalyst filter according to claim 17,
wherein the nano metallic catalyst is dried for 3 to 5 hours at the first surface and dried for 7 to 9 hours at the second surface.

19. The method of preparing the catalyst filter according to claim 10, further comprising:
preparing a coating slurry comprising a nano metallic catalyst, before the spraying of the nano metallic catalyst,
wherein the spraying of the nano metallic catalyst comprises spraying the coating slurry onto the catalyst support.

20. The method of preparing the catalyst filter according to claim 19, wherein the preparing of the coating slurry comprises:
a) adding methyl cellulose to distilled water and stirring at 30° C. to 50° C. for 1 hour to 3 hours to form a slurry;
b) adding bentonite to the slurry of the step (a) and stirring at 30° C. to 50° C. for 1 hour to 3 hours; and
c) adding a nano metallic catalyst to the slurry of the step (b) and stirring at 30° C. to 50° C. for 1 hour to 3 hours.

21. The method of preparing the catalyst filter according to claim 19,
wherein the coating slurry comprises a mixture of 15 wt % to 20 wt % of nano metallic catalyst, 8 wt % to 12 wt % of bentonite, 1 wt % to 2 wt % of methyl cellulose, and 65 wt % to 75 wt % of water.

* * * * *